United States Patent [19]

Yamakami et al.

[11] 3,914,280

[45] Oct. 21, 1975

[54] PROCESS FOR PRODUCING β-AMINOPROPIONITRILE

[75] Inventors: Kiyoshi Yamakami, Tokyo; Osamu Akazawa, Minamifunabori; Yoshiyuki Shibata, Minamifunabori; Nichio Fujimoto, Minamifunabori, all of Japan

[73] Assignee: Daiichi Seiyaku Co., Ltd., Tokyo, Japan

[22] Filed: May 31, 1974

[21] Appl. No.: 475,027

[30] Foreign Application Priority Data

July 30, 1973 Japan.................................. 48-85605

[52] U.S. Cl. ... 260/465.5 R; 260/534 C; 260/534 E
[51] Int. Cl.² ........................................ C07C 120/00
[58] Field of Search ............................ 260/465.5 R

[56] References Cited

UNITED STATES PATENTS 2,401,429  6/1946  Kung............................ 260/465.5 R
2,448,013  8/1948  Buc et al...................... 260/465.5 R

OTHER PUBLICATIONS

Russian Chemical Reviews; Vol. 30, No. 11; Nov. 1961, p. 588.
Industrial & Engineering Chemistry, Vol. 50, No. 8; Aug. 1958, pp. 1115–1118.

*Primary Examiner*—Joseph P. Brust
*Attorney, Agent, or Firm*—Oblon, Fisher, Spivak, McClelland & Maier

[57] ABSTRACT

β-Aminopropionitrile is produced by introducing acylonitrile into an equilibrium reaction mixture of imino-β-β'-propionitrile and excess ammonia.

5 Claims, 1 Drawing Figure

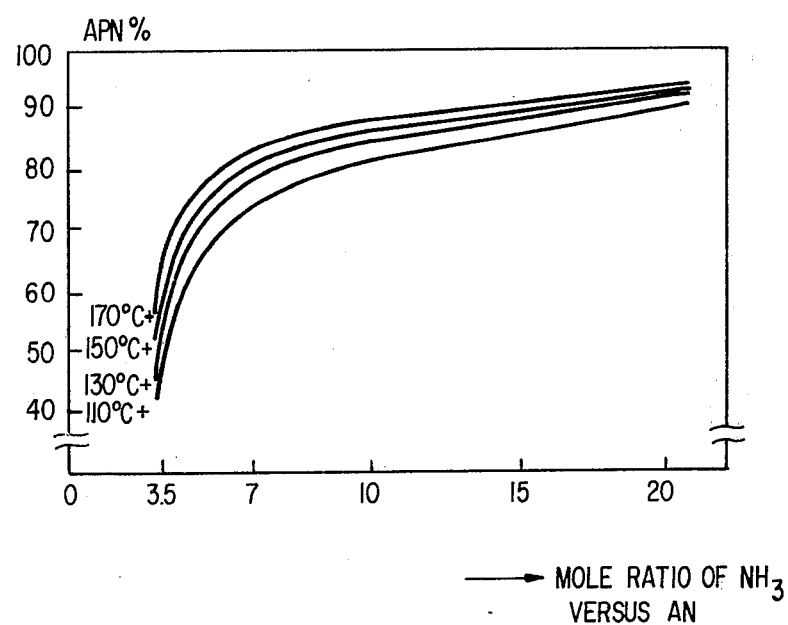

PROCESS FOR PRODUCING β-AMINOPROPIONITRILE

BACKGROUND OF THE INVENTION

1. Field of the Invention

The present invention relates to an improved method for producing β-aminopropionitrile, and more particularly this invention relates to a method for producing β-aminopropionitrile from acrylonitrile and ammonia.

2. Description of the Prior Art:

β-aminopropionitrile (hereinafter APN) is an important raw material for the production of the industrially useful material β-alanine, 1,3-diaminopropane, and the like. In an industrial production, APN has been produced by reacting acrylonitrile with aqueous ammonia in the reaction $$CH_2 = CHCN + NH_3 \rightarrow NH_2CH_2CH_2CN \quad (1)$$

However, the formation of imino-bis-β, β'-propionitrile (hereinafter IBPN) seems to be an unavoidable by-product by the reaction,

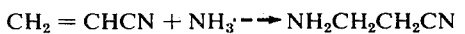
$$NH(CH_2CH_2CN)_2 \quad (2)$$

Efforts have been made in the prior art to minimize this secondary reaction (2) and to increase the yield of APN. Although, in fact, some improvements have been reported, for the most part, these prior art attempts have proven to be at least partially unsuccessful. For instance, it has been reported to react a large excess of ammonia with acrylonitrile at elevated temperatures for a short period of time (Industrial and Engineering Chemistry, Vol. 50, pages 1115-1118 (1958)). It has also been reported to react acrylonitrile with liquid ammonia in the presence of a Raney catalyst (Japanese patent, publish number 39085/1970). However, these methods have not prove to be completely satisfactory in preventing the formation of IBPN. Accordingly, the attention of the prior art has now shifted from efforts designed at preventing the formation of IBPN, to efforts designed to utilize IBPN.

P. M. Kirk had proposed that IBPN can be converted directly to β-alanine by the reaction of IBPN with aqueous ammonia under increased pressure (U.S. Pat. No. 2,334,163). Matusi et al reported that a hydrolyzed product of IBPN, imino-bis-propionic acid, can be reacted with aqueous ammonia in the presence of an alkali metal hydoxide or an alkaline earth metal hydroxide to yield β-alanine (Japanese Patent publish number 29808/1970). According to those methods, however, IBPN is converted to β-alanine, but not to APN.

F. E. Kung has reported a process involving pyrolysis of IBPN. According to that method, IBPN is converted to APN at atmospheric pressure. That technique is proven to be disadvantageous, however, since it requires conversion temperatures of above 200° C, and the yield of APN is stiochiometrically low because of pyrolysis degradation (U.S. Pat. No. 2,401,429).

J. H. Ford et al. had reported that APN can be obtained through the equilibrium reaction of IBPN and ammonia of

(3)

in a 20% yield; J. Am. Chem. Soc., Vol. 69, pages 844–846 (1947); however, that method has proven to be of little industrial potential because of the poor yields of APN.

Accordingly, a need continues to exist for a method converting IBPN to APN in high yields using an industrially attractive technique.

SUMMARY OF THE INVENTION

Accordingly, it is one object of this invention to provide a method for producing β-amino-propionitrile in high yields, which would be industrially and economically attractive.

This and other objects of the invention as will hereinafter become more readily understood by the following description have been attained by reacting acrylonitrile in an equilibrium reaction mixture of imino-bis-β,β'-propionitrile and excess ammonium. In a preferred embodiment, APN is produced from acrylonitrile and ammonia in a continuous circulating system of IBN produced as a by-product of the process.

BRIEF DESCRIPTION OF THE DRAWING

The FIG. 1 shows the amount of APN at the equilibrium with variation of the ammonia quantity and temperature.

DETAILED DESCRIPTION OF THE PREFERRED EMBODIMENTS

It has now been found that APN can be produced in excellent yields by the simultaneous reaction of

(3)

and

(1)

by adding acrylonitrile to the equilibrium mixture (3).

Until now, the introduction of additional amounts of acrylonitrile into the equilibrium mixture of equation (3) had been thought to cause the the secondary reaction (2), thus having the effect of disadvantageously producing more IBPN. It has therefore been a surprising discovery that the reaction (1) can be carried out in the equilibrium mixture of reaction (3), and that this multi-reaction system will be very advantageous for the efficient production of APN, due to the efficient utilization of the ammonia which remains in the equilibrium mixture of equation (3).

Since the secondary reaction of equation (2) occurs inevitably with the reaction (1), even when the reaction (1) is carried out concurrently with the equilibrium reaction (3), a constant amount of IBPN is produced in addition to the resulting APN. The by-product IBPN, may then be used as a raw material for the reaction (3). Thus, a reaction cycle can be set up whereby first the reaction (3) is carried out, followed by reactions (1) and (2), and then followed again by reaction (3) (and so forth), in turn. This invention therefore makes possible continuous production of APN and through the continuous production, enables a higher yield of APN from acrylonitrile than any of the prior art methods. By the method of this invention, yields as high as 90 –95% calculated from the consumed acrylonitrile can be attained, whereas in the prior art methods, yields of at most only 80% have been attained, even when taking into account the increased yields in those prior art methods in which APN is recovered from IBPN.

The relationship between the quantity of ammonia, reaction temperature, time and yield of APN for the reactions (1), (2) and (3) according to the present invention, are shown in the following Table:

Table 1

| Reaction temperature | molar ratio IBPN:ammonia | reaction time (minutes) | yield of APN |
|---|---|---|---|
| 130°C | 1 : 3.5 | 166 | 53.5% |
|  | 1 : 15 | 156 | 85.0 |
| 150°C | 1 : 3.5 | 47 | 60.2 |
|  | 1 : 15 | 45 | 90.1 |
| 170°C | 1 : 3.5 | 16 | 63.3 |
|  | 1 : 15 | 11 | 91.1 |

As can be seen from the above Table, the yield of APN is enhanced by an increase in the quantity of ammonia, and by an increase in the reaction temperature. This effect can be further observed by reference to FIG. 1. However, as the reaction temperature is increased, the degree of hydrolysis of IBPN and APN is also increased.

It has now been found that the extent of hydrolysis can be minimized, if the reaction mixture is cooled immediately after the reaction (3) reaches equilibrium. This suppression seems to be due to the effect that the velocity of the hydrolysis reaction is 1/20 to 1/25 of the velocity of the equilibrium reaction (3). Although an elevation in reaction temperature has the effect of accelerating the hydrolysis, the reaction (3) tends to reach its equilibrium point quite rapidly. Moreover, in order to suppress hydrolysis of the nitriles, and to utilize the ammonia more efficiently, it is recommended to use large excess ammonia, for example, three to 30-fold moles based on the moles of IBPN. The precise amount to be used will be determined by the quantity of acrylonitrile added to the next reaction of equations (1) and (2). Usually, it is preferred that the amount of ammonia remaining after the equilibrium reaction (3), be maintained at between three to five-fold moles based on the amount of acrylonitrile to be added.

The reaction time and temperature for the reaction IBPN and $NH_3$ are mutually dependent. However, in general, good results are attainable with reaction temperatures of 130°–170°C for reaction times of 10 to 150 minutes, preferably 140°–150°C for 20 to 50 minutes. For instance, suitable reaction temperatures and times would include 170°C for 10 minutes, 150°C for 25 minutes and 130°C for 2.5 hours. Especially good results are attained at 140°C for 45 minutes, or 150°C for 25 minutes. Under these conditions, the degree of hydrolysis is minimized, and conversion of IBPN to APN is obtained in good yields. The aqueous ammonia can suitably be used in concentrations of above 10%, and usually will be used in the form of commercially available concentrated aqueous ammonia solutions of 25 – 28% concentrations. Solutions of considerably higher concentrations such as those prepared by addition of liquid ammonia to the commercially available aqueous ammonia, can also equally be used.

The reaction of acrylonitrile with ammonia, represented by the equation (1), and, together with equation (2), have been known to be completed by contacting acrylonitrile with ammonia in a very short period at elevated temperatures. Therefore, use can be made of apparatus which permits quite short contact times of both materials.

The inventors have investigated this amoniation reaction in detail and have found that the velocity of the amoniation is 1000 times as larger as that of the equilibrium reaction (3). If the amoniation is carried out in a consierably short period, the equilibrium reaction will not be influenced by the amoniation. The amount of IBPN produced by adding acrylonitrile into the equilibrium mixture is somewhat larger than that produced only through the reaction (1), since the latter instance, the occurrence of reaction (2) is inevitable. If the reaction is controlled, however, so as to produce a constant amount of IBPN, of course taking into account some loss in the purification step, a certain amount of IBPN circulation will exist within the reaction system, and almost all the acrylonitrile introduced will be converted with ammonia to APN.

As a preferred embodiment of this reaction, the equilibrium mixture of reaction (3) is adjusted to about 105°C. Acrylonitrile is added to this mixture at ordinary temperatures, such as by blowing the acrylonitrile into the mixture through a high pressure pump. The acrylonitrile can be added in a molar ratio of $NH_3$/acrylonitrile of 3 to 5. Temperature of the reaction follows the acrylonitrile addition may be from 100° to 150°C for reaction times of 30 seconds to 10 minutes. Preferred conditions are 120°–130°C for 5 minutes.

There is another important problem in carrying out this invention, which should also be discussed. When IBPN is repeatedly collected for use in the succeeding reaction (3), the reaction (3) appears to be inhibited after several repetitions of the cycle. This tends to interrupt the continuous production reaction and reduce the yields. It has now been found that the inhibition effort seems to be a result of contamination due to the formation of various by-products including $\beta$-alanine, imino-bis-propionic acid or imino-$\beta$-propionamide$\beta'$-propionic acid along with the IBPN which have the effect of inhibiting the reaction. Therefore, it is desirable to remove the carboxylic acids from the IBPN with an anion-exchange resin, so as to assure that the cycle of the reactions will continue to proceed smoothly.

Moreover, it is one of the important discoveries of this invention that the carboxylic acids, $\beta$-alanine or imino-bis-propionic acid which are hydrolysis by-products not only be separated from the IBPN, but can be recovered. After the amoniation, ammonia is recovered, APN is collected, and the IBPN is collected from the residue. The unpurified IBPN is passed through a column of a strongly basic anion-exchange resin (such as Diaion PA-414 (trade name of Mitsubishi Chemical Industries, Ltd. (MCI). The carboxylic acids adsorbed are eluted with sodium hydroxide. The eluant is treated in turn with a strongly acidic cation-exchange resin (such as Diaion IRA-68, trade name of MCI) to obtain $\beta$-alanine and imino-bis-propionic acid, respectively. Alternatively, $\beta$-alanine and imino-bis-propionic acid are adsorbed into a strongly basic anion-exchange resin (such as Diaion PA-414) and are eluted with aqueous ammonia. Sodium hydroxide is added to the eluant (half equivalent to imino-bis-propionic acid) and ammonia is removed. The eluant is then extracted with methanol to provide monosodium imino-bis-propionate and β-alanine, separately.

According to this invention, when APN is produced from acrylonitrile and ammonia through the intermediation of circulating IBPN, it is possible to obtain APN in high yields with very efficient utilization of the ammonia. An example of a flow chart of this method can be illustrated as:

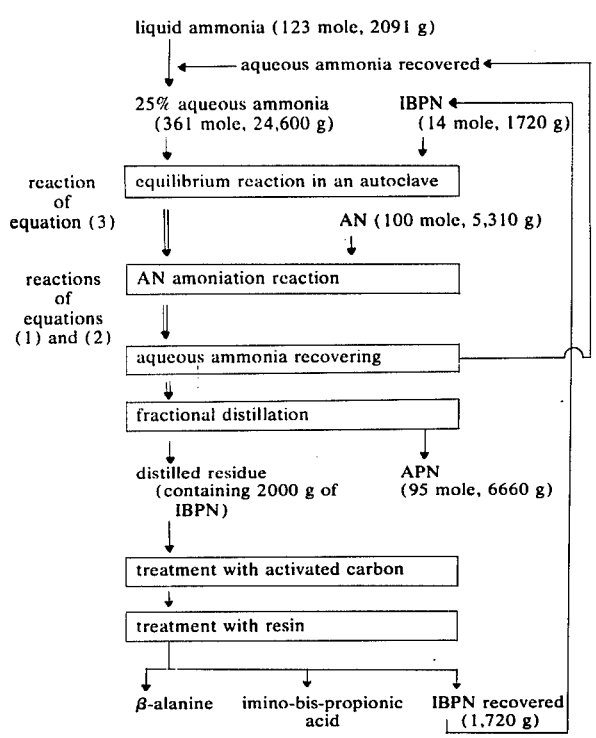

Having generally described the invention, a more complete understanding can be obtained by reference to certain specific examples, which are included for purposes of illustration only and are not intended to be limiting unless otherwise specified.

EXAMPLE 1

250g of 25% aqueous ammonia was heated to 105°C in an autoclave, 53.1g of acrylonitrile (AN) was introduced into the autoclave through a high pressure pump and immediately cooled. Aqueous ammonia was recovered from the reaction mixture at a temperature of below 60°C under reduced pressure. 49.0g of β-aminopropionitrile (APN) was obtained by distillation (rectification) under reduced pressure. The resulting residue containing imino-bis-β, β'-propionitrile (IBPN), as a main component, was dissolved in two-fold water. The solution was treated with activated carbon and passed through a column of Diaion PA-414 (OH type). The eluant was concentrated to give 17.2g of IBPN.

The 17.2g of IBPN obtained above and 250g of 25% aqueous ammonia were heated at 150°C for 30 minutes in an autoclave. After cooling to 105°C, 53.1g of acrylonitrile was introduced to the mixture through a high pressure pump and cooled immediately. After recovering aqueous ammonia, 66.5g of APN was obtained by rectification under reduced pressure. The residue was treated with a resin in the same manner as above and 15.3 g of IBPN was obtained. These reactions were repeated continuously and the results are shown in Table 2. According to this method APN can be obtained in a yield above 90%.

Table 2

| IBPN produced in the previous process | 25% aqueous ammonia | AN | Yield of APN (g) | (%) |
|---|---|---|---|---|
| 1 | 0 | 250 | 53.1 | 49.0 | 70.0 |
| 2 | 17.2 | 250 | 53.1 | 66.5 | 94.8 |
| 3 | 15.3 | 250 | 53.1 | 64.7 | 92.2 |
| 4 | 16.1 | 250 | 53.1 | 65.5 | 93.4 |
| 5 | 15.5 | 250 | 53.1 | 63.1 | 90.0 |
| 6 | 16.5 | 250 | 53.1 | 65.4 | 93.2 |

Amount of raw material (g)

EXAMPLE 2

In Example 1, the carboxylic acids adsorbed to the column of Diaion PA-414 at the initial five times were eluted with sodium hydroxide. The eluant was passed through a column of Diaion SK-IB and β-alanine and imino-bis-propionic acid were eluted with aqueous ammonia. The eluant was passed through a column of Amberlite IRA-68. The eluant was concentrated under reduced pressure to give 19.5 of β-alanine. The column of Amberlite IRA-68 was eluted with aqueous ammonia and the eluant was concentrated to give 6.4g of monoammonium imino-bis-propionate.

Example for reference:

4.3g of IBPN and 25.6g of 25% aqueous ammonia was heated at 150°C for 30 minutes in an autoclave. After the reaction, the reaction mixture was immediately cooled and analyzed by gas chromatography. It was found that 85% of the IBPN had been converted to APN and only 10% of IBPN remained. After the removal of ammonia under reduced pressure at a temperature below 60°C, the reaction mixture was rectified under reduced pressure. 4.1g of APN (bp. 47 C/3mmHg) and 0.8g of a residue were obtained. The yield of APN was 84%.

When the above reaction was carried out at 150°C for 2 hours, 63% of IBPN was found to be converted to APN and only 7% of IBPN remained.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method for producing β-aminopropionitrile which comprises
   a. reacting aqueous ammonia and imino bis-β, β' propionitrile at a mole ratio of 3 : 1 to 30 : 1 and at a temperature of 130° – 170° C for 10 to 150 minutes to form an equilibrium mixture of said imino bis-β, β'-propionitrile and ammonia with β-aminopropionitrile;
   b. adding acrylonitrile to the equilibrium mixture of step (a) wherein the mole ratio of ammonia to acrylonitrile is from 3 : 1 to 5:1, the time of reaction of said acrylonitrile with said equilibrium mixture is from 30 seconds to 10 minutes, and the reaction temperature is from 100 – 150°C;
   c. separating ammonia, β-aminopropionitrile and a residue containing imino bis -β, β'-propionitrile;
   d. introducing said imino bis-β, β'-propionitrile from step (c) into step (a).

2. The method of claim 1, wherein said residue is treated with an anion exchange resin and purified imino bis-β, β-propionitrile is recovered.

3. The method of claim 1, wherein said ammonia of step (c) is admixed with liquid ammonia so as to form said aqueous ammonia of step (a).

4. The method of claim 1, wherein said imino bis-β,β-propionitrile and aqueous ammonia are reacted at 140°–150°C for 20 to 50 minutes.

5. The method of claim 1, wherein said equilibrium mixture and said acrylonitrile is reacted from 120° to 130°C for 5 minutes.

* * * * *